United States Patent
Fukuda et al.

(10) Patent No.: US 7,858,263 B2
(45) Date of Patent: Dec. 28, 2010

(54) SOLID POLYMER ELECTROLYTE FUEL CELL AND METHOD FOR MANUFACTURING THE SAME

(75) Inventors: Kaoru Fukuda, Wako (JP); Ryoichiro Takahashi, Wako (JP); Junji Matsuo, Wako (JP); Tomoyuki Tada, Hiratsuka (JP); Masahiko Inoue, Hiratsuka (JP); Koichi Matsutani, Hiratsuka (JP)

(73) Assignees: Honda Motor Co., Ltd., Tokyo (JP); Tanaka Kikinzoku Kogyo K.K., Tokyo (JP)

(*) Notice: Subject to any disclaimer, the term of this patent is extended or adjusted under 35 U.S.C. 154(b) by 1211 days.

(21) Appl. No.: 11/181,027

(22) Filed: Jul. 14, 2005

(65) Prior Publication Data

US 2006/0019147 A1    Jan. 26, 2006

(30) Foreign Application Priority Data

Jul. 15, 2004  (JP)  .............................. 2004-209216
Apr. 8, 2005   (JP)  .............................. 2005-111742

(51) Int. Cl.
*H01M 4/02*   (2006.01)
*H01M 4/36*   (2006.01)
*H01M 4/90*   (2006.01)
*H01M 4/92*   (2006.01)
*H01M 4/94*   (2006.01)

(52) U.S. Cl. ...................... 429/524; 429/523; 429/525; 429/526

(58) Field of Classification Search ................. 429/41
See application file for complete search history.

(56) References Cited

U.S. PATENT DOCUMENTS 6,936,370 B1* 8/2005 Knights et al. ................ 429/40

2002/0192535 A1* 12/2002 Fukuda et al. ................ 429/42

FOREIGN PATENT DOCUMENTS

| JP | 5-29005    | 2/1993  |
|----|------------|---------|
| JP | 5-258755   | 10/1993 |
| JP | 2000-67873 | 3/2000  |

(Continued)

OTHER PUBLICATIONS

Japanese Office Action dated May 18, 2010 (in Japanese).

*Primary Examiner*—Dah-Wei D Yuan
*Assistant Examiner*—Steven Scully
(74) *Attorney, Agent, or Firm*—Kratz, Quintos & Hanson, LLP (57) ABSTRACT

A solid polymer electrolyte fuel cell comprises: a plurality of electrode structures comprising an anode and a cathode, and polymer electrolyte membrane held between the anode and the cathode, and a plurality of separators for holding the respective electrode structures, with a fuel gas passage for supplying and discharging fuel gas containing hydrogen on a surface opposing the anode; and an oxidant gas passage for supplying and discharging oxidant gas on a surface opposing the cathode. The catalyst layer of the anode comprises a mixture of an ion conductive material, a platinum powder and/or platinum alloy powder and a carbon, the platinum powder and/or platinum alloy powder and carbon substantially exist independently from each other, and the catalyst layer of the cathode comprises a metal support mixture in which the ion conductive material and the electro-conductive material having the supported catalyst material are mixed.

5 Claims, 8 Drawing Sheets

FOREIGN PATENT DOCUMENTS

| | | |
|---|---|---|
| JP | 2003-36859 | 2/2003 |
| WO | WO 01/15249 A2 | 3/2001 |
| WO | WO 01/15254 A2 | 3/2001 |
| WO | WO 01/15255 A2 | 3/2001 |
| WO | WO 01/15274 A1 | 3/2001 |

* cited by examiner

SOLID POLYMER ELECTROLYTE FUEL CELL AND METHOD FOR MANUFACTURING THE SAME

INCORPORATION BY REFERENCE

Priority is claimed on Japanese Patent Application No. 2004-209216, filed Jul. 15, 2004, and Japanese Patent Application No. 2005-111742, filed Apr. 8, 2005, the contents of which are incorporated herein by reference.

FIELD OF THE INVENTION

The present invention is related to a solid polymer electrolyte fuel cell and a method for manufacturing thereof, in particular, a solid polymer electrolyte fuel cell in which the output varies according to a demand load.

RELATED ART

A fuel cell uses hydrogen gas as a fuel gas and generates energy by an electrochemical reaction of hydrogen and oxygen. There are various types of fuel cells including a phosphoric acid fuel cell, a molten carbonate fuel cell, a solid electrolyte type fuel cell, and a solid polymer electrolyte fuel cell. Among these, a solid polymer electrolyte fuel cell can start operation at a normal temperature and can also provide higher output with small configuration, and thus holds great promise as a power source for two-wheeled or four-wheeled vehicles, or portable power supply. In the case where such a solid polymer electrolyte fuel cell is actually used, a electrode structure, a basic unit of a fuel cell, is held between separators to make a single cell, and then combined with several tens to hundreds of single cells to be used as a stack (battery).

Figure 9:
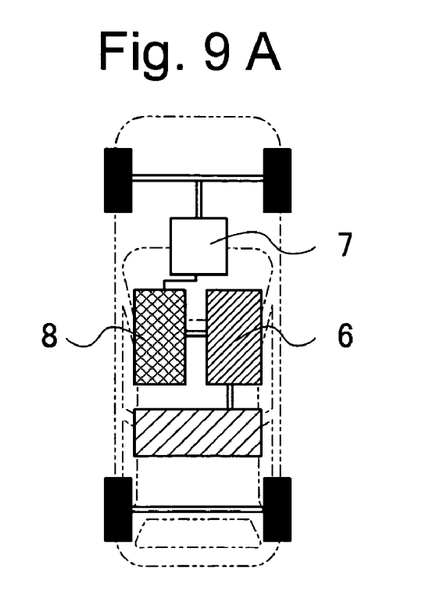
FIGS. 9A and 9B show a fuel cell system according to the present invention and the conventional fuel cell system.

As shown in FIGS. 9A and 9B, there are two kinds of fuel cell systems that combine the above-mentioned fuel cell with a motor. One of these is a fuel cell-storage element (battery) hybrid system (shown in FIG. 9A), and the other is a fuel cell direct connection system (shown in FIG. 9B) in which a fuel cell is directly linked with a motor. A conventional fuel cell system of FIG. 9A is configured in such a way that a fuel cell 6 is connected to a storage element 8, and the storage element 8 is connected to a motor 7 in series. This allows the fuel cell 6 in a vehicle to continuously feed a constant amount of electric current without being influenced by a change in acceleration. As in the case with a fuel cell direct connection system of FIG. 9B, the fuel cell 6 and the storage element 8 for storing electricity is directly connected in parallel to the motor 7 and mounted to a vehicle, it is necessary at the anode side to supply hydrogen flexibly corresponding to changes in the output generated according to changes in the acceleration of the vehicle, however, the hydrogen supplied as a fuel is in a state of gas, and poorly responds in controlling the amount of supply. It is therefore difficult for the system to supply hydrogen corresponding to the increase in the amount of current, and to deal flexibly with the changes in the output. As a result, fuel shortage arises temporarily in an electrode structure.

In connection with the fuel shortage, electrolysis of water advances in the anode in order to compensate the decreased supply amount of electrons, and the so-called reverse voltage arises. When the electrolysis of water occurs in the anode, it will cause a corrosion of the carbon used for the catalyst carrier in the catalyst layer which constitutes the anode, and will result in a deterioration of the performance. The deterioration of the performance of the anode will lead to a deterioration of the power generation performance of the fuel cell as a whole.

In order to solve these problems, two roughly divided methods have been examined. One of these is a method of promoting electrolysis of water (refer to Patent document 1 (International Publication No. WO01/15274), Patent Document 2 (International Publication No. WO01/15249), and Patent Document 3 (International Publication No. WO01/15255)), and the other is a method of improving the corrosion resistance of the material used for an electrode (refer to Patent document 4 (International Publication No. WO01/15254)).

Patent document 1 discloses that a catalyst layer of the anode is mixed with a catalyst which promotes the electrolysis of water. This prevents oxidization of the carbon by the reverse voltage generated by a fuel shortage. Patent document 2 discloses that a foundation layer or catalyst layer of the anode is added with a PTFE resin (Teflon: registered trademark) or graphite to increase the water content of the anode. The electrolysis of water arising in a priority basis at the time of generation of the reverse voltage prevents the corrosion of the carbon of the catalyst carrier. Patent document 3 further discloses that the catalyst layer of the anode is mixed with a catalyst that promotes electrolysis of water and then the foundation layer or catalyst layer in the anode is added with the PTFE resin or a carbon in a form of graphite. This increases the amount of water in the anode catalyst layer and to control the oxidization of carbon generated by reverse voltage. Patent document 4 further discloses that the increase in the rate of catalyst support in the catalyst layer or the improvement in the corrosion resistance of the catalyst carrier controls the degradation of the anode component.

The methods disclosed in Patent Documents 1 through 4 control the corrosion of carbon, however, does not fully satisfy the resistance property to the reverse voltage. These methods are effective in the case of a temporary fuel shortage, however, in actual operation, speed fluctuation is conducted rapidly and repeatedly and the fuel shortage incurs, and resulting in the degradation of the power generation performance due to a development of corrosion reaction of carbon.

SUMMARY OF THE INVENTION

It is an object of the present invention to provide, for a fuel cell of which output varies according to the demand load, an electrode for a fuel cell and a fuel cell which can hold a property of high power generation and has a sufficient durability even when the reverse voltage is generated by a fuel shortage accompanied by a rapid change in the output.

More specifically, the present invention provides the followings:

(1) A solid polymer electrolyte fuel cell which varies an output according to a demand load, comprising: a plurality of electrode structures comprising an anode and a cathode, each having a diffusion layer and a catalyst layer, and polymer electrolyte membrane held between the anode and the cathode; and a plurality of separators for holding the respective electrode structures, comprising a fuel gas passage for supplying and discharging fuel gas containing hydrogen on a surface opposing the anode; and an oxidant gas passage for supplying and discharging oxidant gas on a surface opposing the cathode, the electrode structures between the separators being stacked, wherein the catalyst layer of the anode comprises a mixture of an ion conductive material, a platinum powder and/or platinum alloy powder and a carbon, the platinum powder and/or platinum alloy powder and carbon substantially exist independently from each other, and the catalyst layer of the cathode comprises a metal support mixture in which the ion conductive material and the electro-conductive material which has the supported catalyst material are mixed.

According to the invention shown in (1), the use of a mixture of an ion conductive material, a platinum powder and/or platinum alloy powder, and a carbon in the catalyst layer of the anode (negative electrode) makes it possible for the catalyst reaction and electronic conduction to be performed in an aggregate of platinum powder and/or platinum alloy powder. Since the platinum powder and/or platinum alloy powder and carbon substantially exist independently from each other, a contact ratio with carbon, platinum powder and/or platinum alloy powder can be made smaller. Since carbon securest the passages for gas and water in the catalyst layer, the water and oxygen generated by the reverse voltage can efficiently be discharged. This advances the electrolysis of water at the time of fuel shortage without having the corrosion of carbon.

Hereinafter, the "ion conductive material" is referred to as a polymer electrolyte. The "platinum alloy powder" includes, for example, a platinum-ruthenium alloy. The state of "substantially independent" is referred to as a platinum powder and/or platinum alloy powder in a state not supported by carbon. The state indicates the powder that exists separately from each other, however, the state also includes the powder that is mutually in contact with each other. Further, it is not intended to exclude a material which entraps impurities. In a fuel cell according to the present invention, the electrode structures comprising the anodes; the cathode; and the polymer electrolyte membrane held between the anode and the cathode, and the separators holding the electrode structures, are stacked. Preferably, the separators hold individual electrode structure from the anode side or the cathode side, however, one separator may have a shape with the anode and the cathode of the next electrode structure.

(2) A solid polymer electrolyte fuel cell according to (1) wherein the platinum alloy powder is a platinum ruthenium alloy having an average particle size of 3 nm to 10 nm.

According to the invention shown in (2), by setting a mean particle size of a platinum ruthenium alloy to a range described above, the solid polymer electrolyte fuel cell enables to yield a higher durability with higher terminal voltage.

From a viewpoint of preventing carbon monoxide poisoning, it is particularly preferable to use platinum ruthenium alloy instead of a single use of platinum powder for the catalyst layer in the anode layer. However, the ruthenium ingredient (alloy ingredient) will be eluted when fuel shortage arises during the use of the platinum ruthenium alloy. The range of the average particle size of platinum alloy is thus important when platinum alloy is used for the catalyst layer. For example, when the average particle size is less than 3 nm in which the specific surface area is larger and more activity points exist, the terminal voltage is inevitably higher. On the other hand, at the time of fuel shortage, the dissolution reaction of alloy ingredient progresses faster than the corrosion reaction of a carbon material and leads to a decreased durability. When an average particle size is not less than 10 nm in which the specific surface area is smaller and fewer activity points exist, the terminal voltage is inevitably lower.

(3) The solid polymer electrolyte fuel cell according to (1) or (2) wherein the specific surface area of the carbon is in a range of no less than 50 $m^2/g$ and no more than 800 $m^2/g$.

According to the invention described in (3), setting the specific surface area of carbon to a range of no less than 50 $m^2/g$ and no more than 800 $m^2/g$ allows more efficient discharge of the generated gas and water. When the specific surface area is no more than 50 $m^2/g$, it is difficult to secure the diffusion passage of the gas and rapidly reduces the power generation performance.

(4) The solid polymer electrolyte fuel cell according to any one of (1) to (3) in which no less than 40% and no more than 100% of particles exist with a distance of no less than 100 nm between the electro-conductive material and the noble metal powder.

According to the invention described in (4), setting the distance at 100 nm and more between the electro-conductive material and the noble metal powder allows the electronic conduction path to be supported only by noble metal powder. When the distance is set at 100 nm or less, however, the portion of electronic conduction path through electro-conductive material becomes larger, and the rate at which the electronic conduction path is intercepted due to the corrosion of an electro-conductive material upon occurrence of reverse voltage becomes higher.

(5) A method for manufacturing a solid polymer electrolyte fuel cell which varies according to a demand load, comprising the steps of: manufacturing an anode and a cathode each having a diffusion layer and a catalyst layer; manufacturing a plurality of electrode structures in which polymer electrolyte membrane is held between the anode and the cathode; holding the electrode structures between a plurality of separators comprising a fuel gas passage for supply and discharge of fuel gas containing hydrogen on a surface opposing the anode; and a passage for oxidant gas for supply and discharge of oxidant gas on a surface opposing the cathode and stacking the electrode structures held between the separators; manufacturing a paste by mixing an ion conductive material, platinum powder and/or platinum alloy powder, and carbon, and forming an electrode sheet by applying the paste onto a substrate formed in a continuous sheet, to form the catalyst layer of the anode.

According to the invention described in (5), a catalyst layer can be manufactured without conducting complicated manufacturing steps by providing the manufacturing step of the catalyst layer of the anode with the paste manufacturing step and the sheet formation step. The substrate in the above sheet formation step is not specifically limited to, but is preferably, a carbon, a carbon paper, or a Teflon sheet. When using the Teflon sheet, it is preferred that the Teflon sheet is firstly applied with a paste, and then transferred on a membrane in the transferring process.

In the solid polymer electrolyte fuel cell according to the present invention, the use of a mixture of an ion conductive material, carbon, platinum powder and/or platinum alloy powder for the catalyst layer of the anode secures an electronic conduction path and passages for gas and water respectively in an independent condition. This allows efficient discharge of oxygen and water generated by the reverse voltage, and also allows the electrolysis of water without corrosion of the electro-conductive material.

BEST MODE FOR CARRYING OUT THE INVENTION

Hereinafter, the present invention will be described in more detail.

Figure 1:
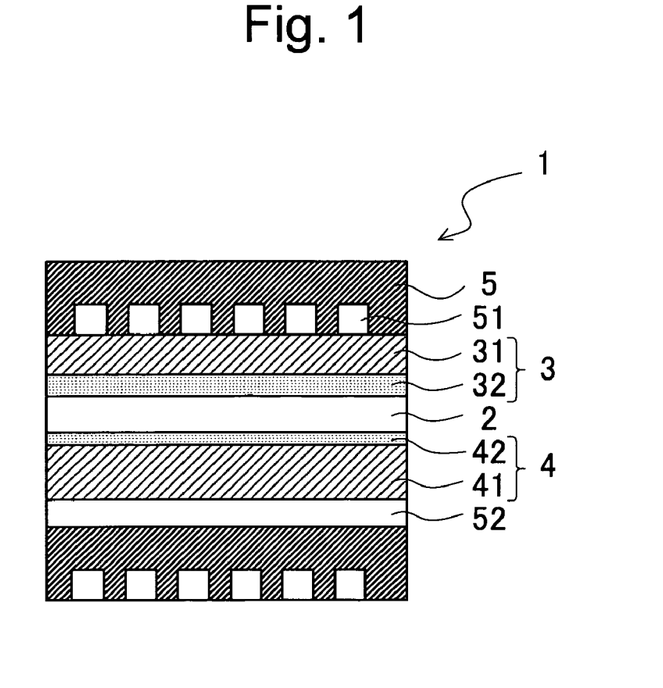
FIG. 1 is a sectional view showing a single cell which constitutes the solid polymer electrolyte fuel cell according to the present invention.

FIG. 1 is a sectional view of the single cell 1 which constitutes the solid polymer electrolyte fuel cell according to the present invention. In the single cell 1, a pair of electrodes, i.e., anode 3 and cathode 4 oppose with each other and are laminated via an electrolyte membrane 2, and then sandwiched by a pair of separators 5. The anode 3 and cathode 4 comprise diffusion layers 31 and 41 and catalyst layers 32 and 42, respectively, and a hydrogen conduction channel 51 is formed in the separator 5 joined to the diffusion layer 31, and the separator 5 is laminated via air conduction channel 52 joined to the diffusion layer 41.

Preferably, the electrolyte membrane 2 is constituted from a polymer electrolyte, and more preferably, a polymer electrolyte which is a fluoropolymer having all or part of polymer skeleton being fluorinated, and is provided with an ion exchange group, or a polymer electrolyte which is a hydrocarbon polymer having no fluorine in the polymer skeleton, and is provided with an ion exchange group. The ion exchange group contained in such polymer is not limited thereto although selected appropriately according to the specific applications. In other words, ion exchange group can be sulfonic acid, carboxylic acid, phosphoric acid, etc. These polymers may also include several types of ion exchange group.

A solid polymer electrolyte in which all or part of polymer skeleton is fluorinated specifically includes a perfluorocarbon sulphonic acidic polymer such as Nafion (registered trademark), perfluorocarbon phosphonic acidic polymer, trifluorostyrene sulfonic acidic polymer, ethylene tetrafluoro ethylene-g-styrene sulfonic acidic polymer, etc., and it is preferable to use Nafion.

A hydrocarbonic solid polymer electrolyte in which no fluoride is contained specifically includes polysulfonesulfonic acid, polyaryletherketonesulfonic acid, polybenzimidazolealkylphosphonic acid, etc.

Preferably, the ion conductive material in the catalyst layer 32 of the anode 3 is constituted with a polymer electrolyte, and more preferably of a polymer electrolyte that is similar to electrolyte membrane 2. A crystalline fiber may also be added as a pore-forming material. It is also preferred that the catalyst layer 42 at the side of cathode 4 has a similar structure as the conventional electrode.

It is preferred that the diffusion layer 31 is formed of a porous carbon paper and the like so that the air containing hydrogen gas as a fuel to be supplied and oxygen can evenly reach a catalyst layer 32, respectively. Known materials such as carbon and metal may be used as a material for the separator 5, and it is preferred that projections and depressions are given on a part of the separator 5 to constitute the hydrogen conduction channel 51.

The mechanism of generating a reverse current will be shown as follows. At a normal temperature, hydrogen to be used as a fuel is firstly consumed at the anode 3 and hydrogen ion and electron are generated.

$$2H_2 \rightarrow 4H^+ + 4e^- \quad (1)$$

Secondly, oxygen, hydrogen ion, and electron are consumed at the cathode 4 and water is generated.

$$O_2 + 4H^+ + 4e^- \rightarrow 2H_2O \quad (2)$$

Among the product resulting from the reaction shown in the equation (1), the hydrogen ion passes through the polymer electrolyte membrane that is arranged between the anode 3 and the cathode 4, and the electron passes through the external circuit which connects the anode 3 and the cathode 4 and then consumed by the reaction shown in the equation (2).

When the output changes, in order to maintain the large current required for the change, electron is supplied from the anode 3 side so that the decreased amount of supply resulting from the reaction shown in equation (1) in connection with the shortage of hydrogen is replenished. The following equations (3) and (4) show the reaction in the anode 3 at the time of the change in the output.

$$2H_2O \rightarrow O_2 + 4H + ^+4e^- \quad (3)$$

$$C + 2H_2O \rightarrow CO_2 + 4H^+ + 4e^- \quad (4)$$

When the reverse voltage occurs through this reaction, it continues for several seconds until the supply of hydrogen of fuel catches up, and leading to a corrosion of the carbon which is a catalyst in the anode 3 side. It is therefore preferred to have a structure shown below so that the catalyst layer 32 at the anode side can promptly discharge the generated oxygen and allows efficient electrolysis of water.

Figure 2:
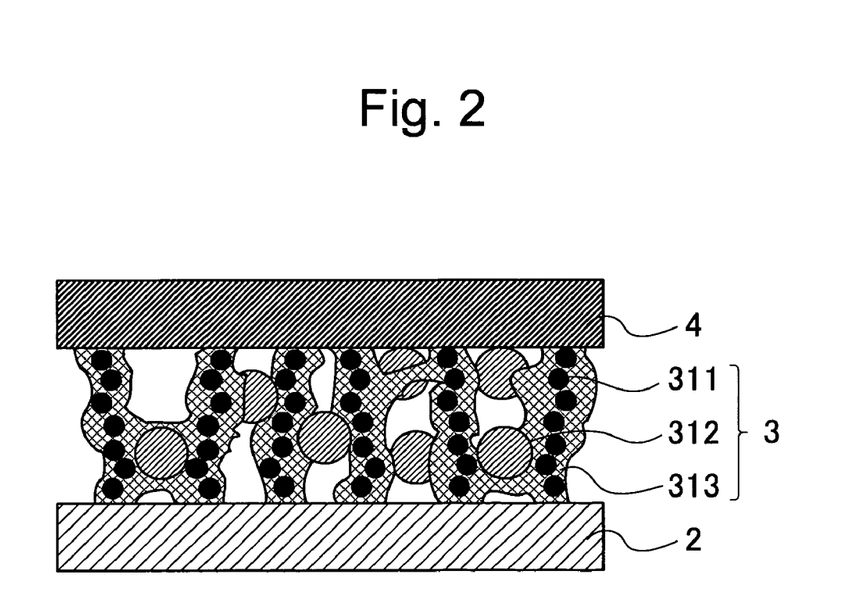
FIG. 2 shows a catalyst layer of the anode side of the solid polymer electrolyte fuel cell according to the present invention.

FIG. 2 shows the catalyst layer 32 at the anode side in FIG. 1. Differing from the conventional catalyst layer in the fuel cell, the platinum powder 311, which is a catalyst, is considered not to be supported by the carbon 312, but to exist independently from each other. The circumference of the platinum powder 311 is surrounded with the polymer electrolyte 313. The electronic conduction path is formed with the platinum powder 311 and the polymer electrolyte 313. It is assumed that the discharge passages of gas and water (not shown) are formed owing to the carbon 312 that is an electronic conduction material existing between these conduction paths. The discharge passage makes it possible to efficiently discharge the water and gas generated through the reverse voltage, reduce the contact surface area of the platinum powder 311 and carbon 312, and thus preventing the corrosion of the carbon 312 generated through the reverse voltage. It is preferred that the amount of the platinum powder 311 is sufficient to form the conduction path.

For the formation of the catalyst layer 32, a paste manufacturing process is firstly conducted in which the polymer electrolyte 313, the platinum powder 311, and the carbon 312 are mixed to form a paste, a sheet formation process then follows in which the paste obtained from the previous process is applied on the substrate (a Teflon sheet in this embodiment) which constitutes the diffusion layer. The sheet is then dried and sandwiches the electrolyte membrane. In the next transferring process, the sheet is transferred by using a hot press at a temperature of 130 to 160 degrees C. The electrode structure sandwiched by the separators completes the manufacturing process of the single cell.

On the other hand, the conventional manufacturing process of the catalyst layer includes an ion exchange supporting method. Specifically; as for the catalyst layer, the carbon and ion-exchange membrane is dissolved and mixed, the carbon is then processed such that the surface is formed with a membrane, and the solution containing a dissolved platinum complex is immersed in the pore of the membrane, to perform an ion exchange reaction. A reduction reaction is subsequently performed, and platinum is unevenly distributed in the border plane of the carbon which is an electronic conductor. As described, the electrode structure of the solid polymer electrolyte fuel cell according to the present invention is simple in formation process of the catalyst layer, and thus leads to a reduction of the manufacturing cost.

EXAMPLE

Example 1

Production of a Sample 1

<Preparation of Cathode Electrode>

35 g of ion conductive polymer (trade name: Nafion SE2020, produced by Du Pont Kabushiki Kaisha), 10 g of platinum support carbon particles (TEC10E50E produced by Tanaka Kikinzoku Kogyo K.K.) in which carbon black and platinum were mixed at a weight ratio of 50:50, and a 2.5 g of crystalline carbon fiber (VGCF produced by Showa Denko K.K.) were mixed in isopropanol to make a cathode catalyst paste. The cathode catalyst paste was applied on the Teflon (FEP) sheet so that it contains 0.3 mg/cm$^2$ of platinum and dried to form an electrode sheet A.

<Preparation of Anode Electrode>

In a 5 g of ion conductive polymers (trade name: Nafion SE2021, produced by Du Pont Kabushiki Kaisha) and 1 g of carbon black powder (Ketjenblack by Cabot Corp.), 9 g of catalyst powder Pt—Ru alloy powder, 5 g of pure water, and 10 g of 1-propanol was mixed to make an anode catalyst paste. The anode catalyst paste was applied on the FEP sheet so that it contains 0.5 mg/cm$^2$ of catalyst metal and dried to form an electrode sheet B. The electrolyte membrane was sandwiched between the above mentioned electrode sheet A and electrode sheet B for transfer printing by way of a decal method (a transfer method) to form a junction with a catalyst layer (CCM).

<Preparation of a Cathode Gas Diffusion Layer>

A carbon paper (TGP-H-060 produced by Toray Industries, Inc.) was water-repellent processed with Teflon dispersion (FEP120J produced by Mitsui Du Pont Chemical). The carbon paper was applied with a foundation layer paste 1, a mixture of 4.0 g of carbon black (Vulcan VC72R produced by Cabot Corp.) and 6.0 g of Fluon 170J (produced by Asahi CIC) was mixed with 50 g of ethylene glycol and then dried. A foundation paste 2, a mixture of a 5.0 g of carbon black (Ketjenblack by Lion Akzo Co., Inc.), 25 g of polymer electrolyte (DE2020 produced by Du Pont Kabushiki Kaisha) and 2.5 g of vapor phase growth carbon fiber (VGCF produced by Showa Denko K.K.) with 125 g of N-Methylpyrrolidone (NMP) was applied and dried to form a gas diffusion layer sheet A.

<Preparation of Anode Gas Diffusion Layer>

A carbon paper (TGP-H-060 produced by Toray Industries, Inc.) was water-repellent processed with Teflon dispersion (FEP120J produced by Mitsui Du Pont Chemical). The carbon paper was applied with a foundation layer paste 1, a mixture of 4.0 g of carbon black (Vulcan VC72R produced by Cabot Corp.) and 6.0 g of Fluon 170J (produced by Asahi CIC) was mixed with 50 g of ethylene glycol and then dried. The gas diffusion layer sheet B was prepared by applying foundation layer paste 2, a mixture of 12.5 g of 60% platinum-ruthenium support carbon particles, 45 g of polymer electrolyte (DE2020 produced by Du Pont Kabushiki Kaisha), 2.5 g of vapor phase growth carbon fiber (VGCF produced by Showa Denko Kabushiki Kaisha) on the carbon paper and dried.

<Preparation of Electrode Structure MEA>

A junction (CCM) of a membrane and a catalyst layer was sandwiched by the above-mentioned gas diffusion layer sheet A and gas diffusion layer sheet B, and unified by using a hot press, and electrode structure (MEA) was produced.

Example 2

Production of Sample 2

In 10 g of ion conductive polymers (Nafion SE2021) and 1 g of carbon black powder (Ketjenblack produced by Lion Akzo Co., Inc.), 1 g of crystalline carbon fiber (VGCF produced by Showa Denko K.K.), 8 g of catalyst powder Pt—Ru alloy powder, 5 g of pure water, and 10 g of 1-propanol was mixed to make an anode catalyst paste. The anode catalyst paste was applied on the FEP sheet so that it contains 0.5 mg/cm$^2$ of catalyst metal and dried to form an electrode sheet B. The electrode sheet B and the previously prepared electrode sheet A sandwiching the electrolyte membrane for transfer printing by way of a decal method to form CCM. The CCM was sandwiched by the previously water-repellent processed diffusion layer to form MEA.

Example 3

Production of Sample 3

The sample was prepared in a similar way as in Example 2 except that 20 g of the ion conductive polymer (Nafion SE2021) was added.

Example 4

Production of Sample 4

The sample was prepared in a similar way as in Example 1 except that 1 g of carbon black powder (Ketjenblack burned product at 2800 degrees C.:BET 81 m$^2$/g) was added.

Example 5

Production of Sample 5

The sample was prepared in a similar way as in Example 1 except that 1 g of carbon black powder (Vulcan XC72-R produced by Cabot: BET2501 m$^2$/g) was added.

Example 6

Production of Sample 6

In 10 g of ion conductive polymers (Nafion SE2021) and 2 g of carbon black powder (Ketjenblack produced by Lion Akzo Co., Inc.), catalyst powder, 8 g of Pt—Ru alloy powder, 5 g of pure water, and 10 g of 1-propanol was mixed to make an anode catalyst paste. The anode catalyst paste was applied on the FEP sheet so that it contains 0.5 mg/cm$^2$ of catalyst metal and dried to form an electrode sheet B. The electrode sheet B and the previously prepared electrode sheet A sandwiching the electrolyte membrane to form a CCM by way of a decal method. The CCM is sandwiched by the previously water-repellent processed diffusion layer to form a MEA.

Example 7

Manufacture of Sample 7

30 g of ion conductive polymer (Nafion SE2021 produced by Du Pont Kabushiki Kaisha.), and a total of 10 g of a mixture of carbon black and a platinum ruthenium alloy adjusted at a weight ratio of 10:90 was mixed in isopropanol to make a anode catalyst paste. The anode catalyst paste was applied on the FEP sheet so that the amount of platinum was set to 0.3 mg/cm$^2$, and dried to form an electrode sheet B. The following example was prepared in a way similar to the method in Example 1.

Example 8

Production of Sample 8

The sample was prepared in a similar way as in Example 7 except that the carbon in the platinum ruthenium alloy support carbon particle in Example 8 and the platinum ruthenium alloy was made at a weight ratio of 30:70.

Example 9

Production of Sample 9

The sample was prepared in a similar way as in Example 7 except that 5 g of the weight of the ion conductive polymer in Example 8 was added and carbon black powder (BET59 m$^2$/g) was used.

Example 10

Production of Sample 10

The sample was prepared in a similar way as in Example 1 except that the average particle size of catalyst powder Pt—Ru alloy powder in Example 1 was set at 1.5 nm. The Pt—Ru alloyed powder was synthesized using micro emulsion method. The average particle size of the Pt—Ru alloyed powder can be adjusted by adjusting the ratio of the precursor concentration and a surfactant in the emulsion.

Example 11

Production of Sample 11

The sample was prepared in a similar way as in Example 1 except that the average particle size in the catalyst powder Pt—Ru alloyed powder in Example 1 was set at 2.2 nm.

Example 12

Production of Sample 12

The sample was prepared in a similar way as in Example 1 except that the average particle size in the catalyst powder Pt—Ru alloyed powder in Example 1 was set at 2.8 nm.

Example 13

Production of Sample 13

The sample was prepared in a similar way as in Example 1 except that the average particle size in the catalyst powder Pt—Ru alloyed powder in Example 1 was set at 3.5 nm.

Example 14

Production of Sample 14

The sample was prepared in a similar way as in Example 1 except that the average particle size in the catalyst powder Pt—Ru alloyed powder in Example 1 was set at 5.0 nm.

Example 15

Production of Sample 15

The sample was prepared in a similar way as in Example 1 except that the average particle size in the catalyst powder Pt—Ru alloyed powder in Example 1 was set at 8.5 nm.

Example 16

Production of Sample 16

The sample was prepared in a similar way as in Example 1 except that the average particle size in the catalyst powder Pt—Ru alloyed powder in Example 1 was set at 11.0 nm.

Example 17

Production of Sample 17

The sample was prepared in a similar way as in Example 1 except that the average particle size in the catalyst powder Pt—Ru alloyed powder in Example 1 was set at 15.0 nm.

Comparative Example 1

Production of the Comparative Sample 1

A catalyst layer of anode electrode that was prepared in a similar way as the conventional electrode was used. 15 g of ion conductive polymer (Nafion SE2021 produced by Du Pont kabushiki Kaisha) and a mixture of carbon black and a platinum ruthenium alloy at a weight ratio of 10:90 was adjusted to make a total 10 g of a platinum ruthenium alloy support carbon particle (produced by Tanaka Kikinzoku Kogyo K.K.) and mixed in isopropanol to make an anode catalyst paste. The anode catalyst paste was applied on the FEP sheet so that the amount of platinum was set at 0.3 mg/cm$^2$, and dried to form an electrode sheet B. The following example was prepared in a way similar to the method in Example 1.

[Physical Property Test]

Figure 3:
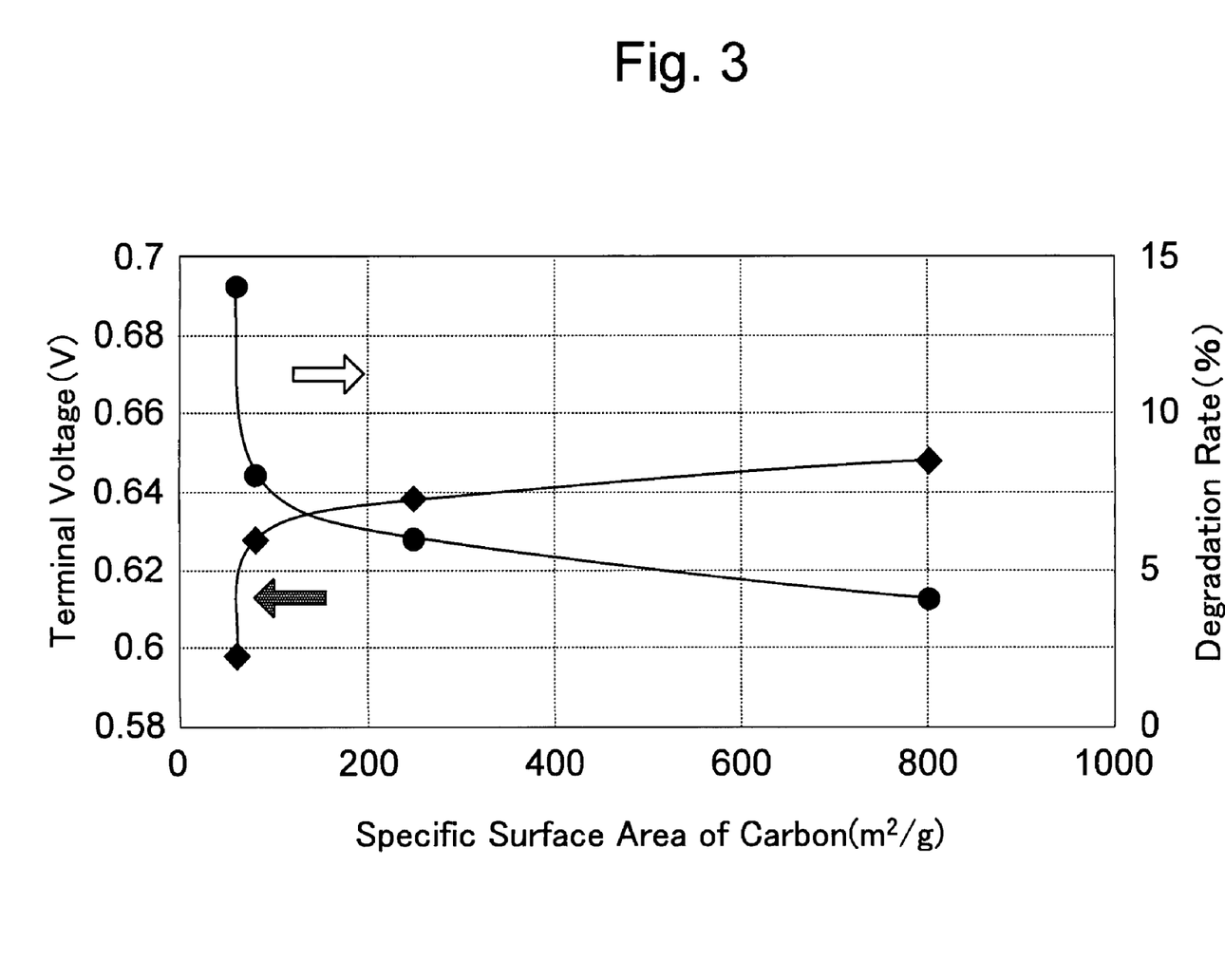
FIG. 3 shows a relation between the specific surface area of carbon and the terminal voltage, and a relation between the specific surface area of carbon and the rate of degradation.

FIG. 3 represents a graph showing a relation between the specific surface area of the carbon added, terminal voltage, and the degradation rate in Examples 1, 4, 5, and 8. The graph suggests that smaller specific surface area of the carbon to be added makes it impossible to secure the gas diffusion passage and leads to a rapid deterioration of power generation performance. It also suggests that the specific surface area is preferably no less than 80 m$^2$/g.

Figure 4:
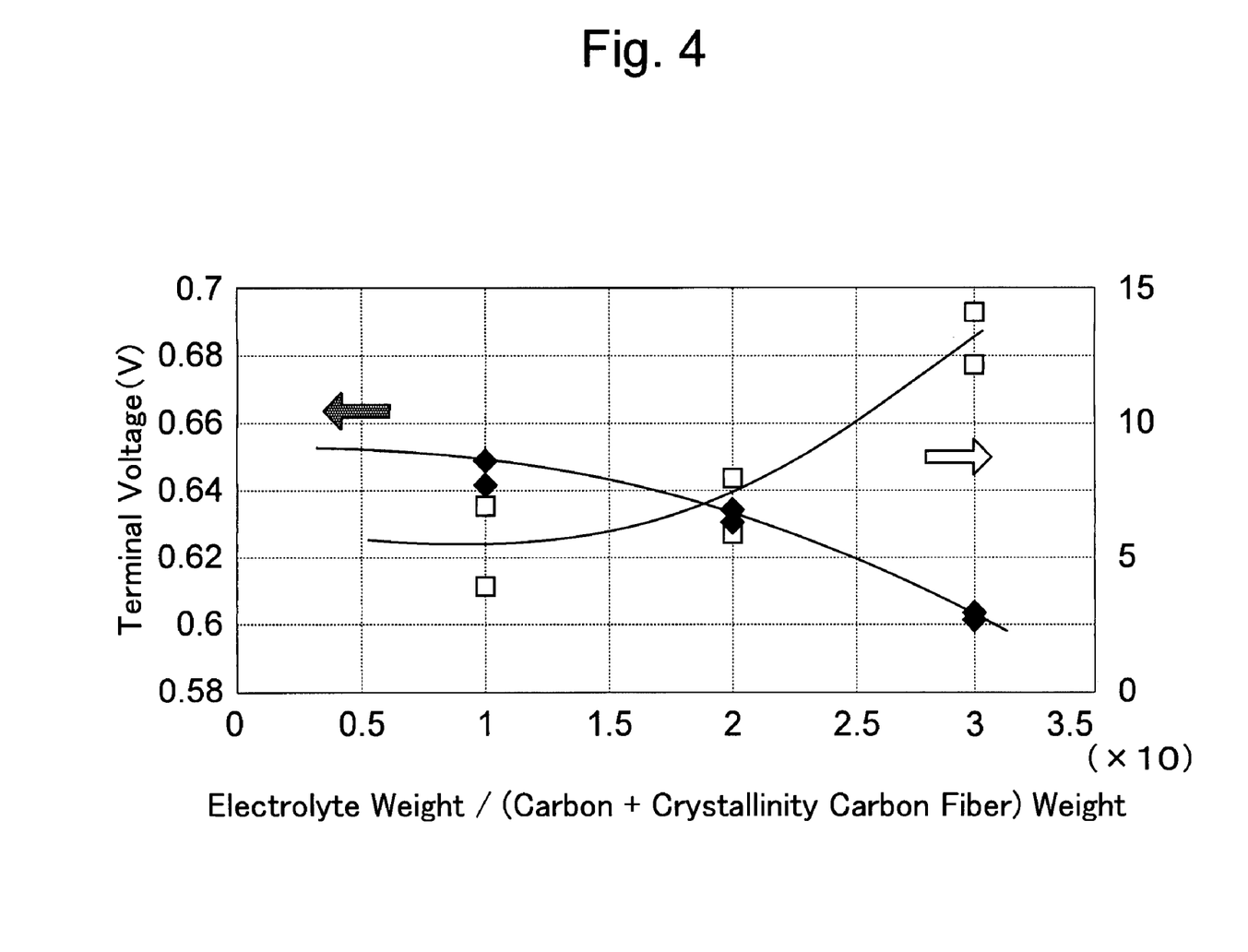
FIG. 4 shows a relation between a weight ratio of carbon to electrolyte and the terminal voltage, and a relation between a weight ratio of carbon to electrolyte and rate of degradation.

FIG. 4 shows a relation among a weight ratio, terminal voltage, and degradation rate of the added carbon and the electrolyte in Examples 3, 4, and 9. As for the weight ratio of carbon and electrolyte, the increase in the mass of electrolyte made it impossible to secure a gas diffusion passage, and led to degradation of initial performance and the performance after durability test. The results represent that the ratio of electrolyte weight/(carbon+crystallinity carbon fiber) weight is preferably set at 2.5 or less in order to restrict the degradation rate after durability test at 10% or less.

Figure 5:
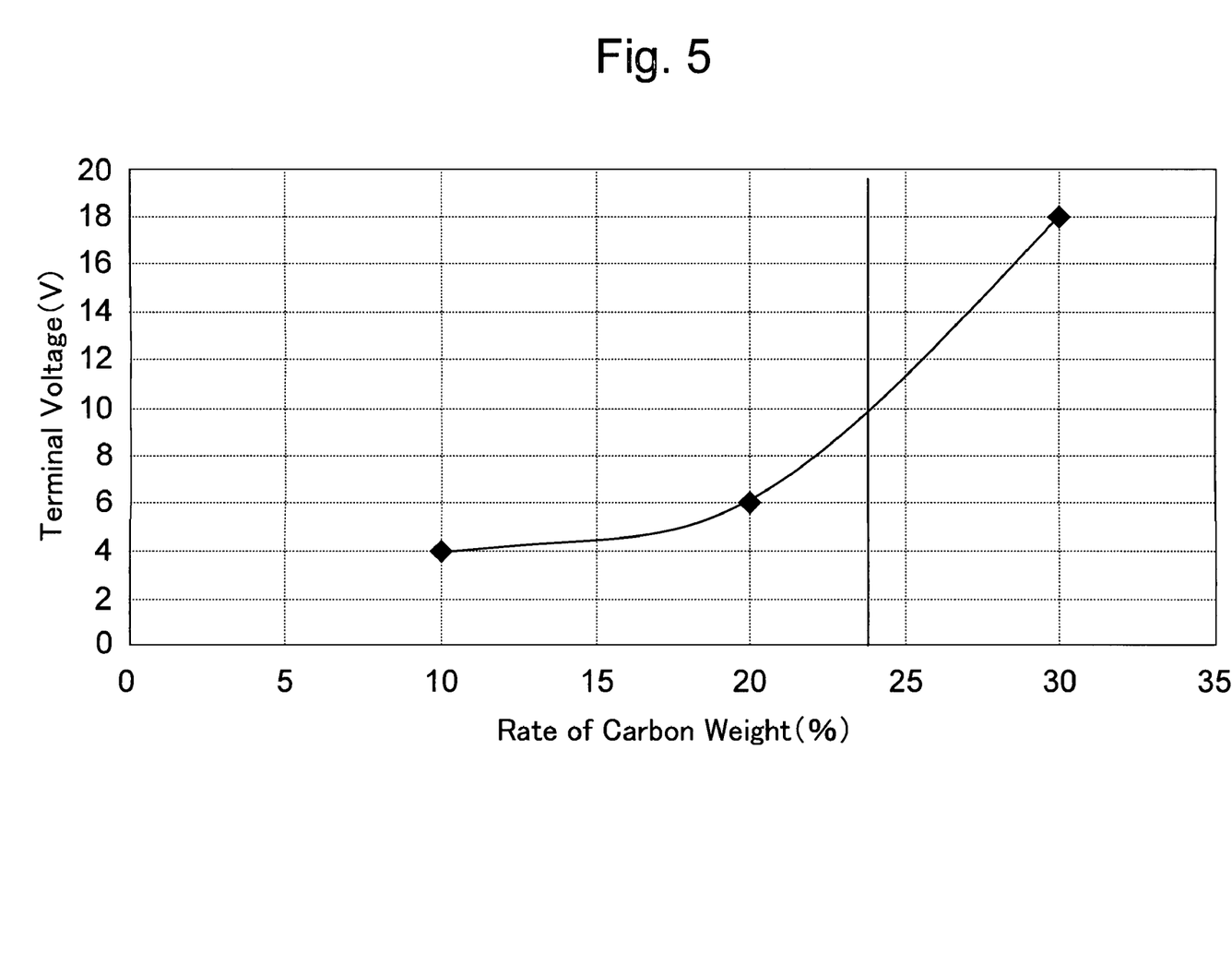
FIG. 5 shows a relation between the amount of loadings of carbon and the terminal voltage.
Figure 6:
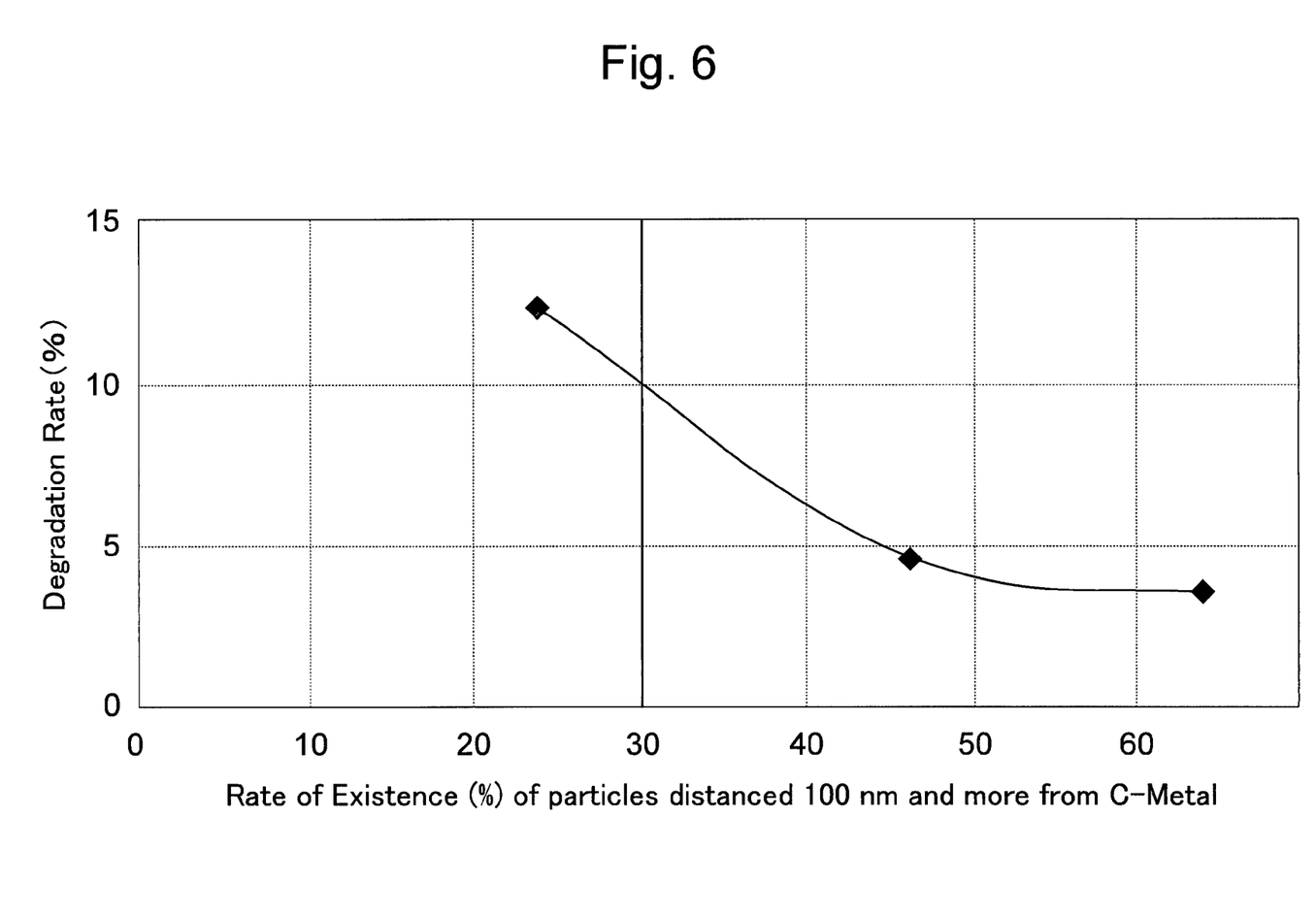
FIG. 6 shows a relation between a distance between carbon and catalyst metal and the rate of degradation.

FIG. 5 represents a graph showing a relation between the amount of added carbon and the terminal voltage in Examples 1, 7, and 9. FIG. 6 represents a graph showing a relation between the ratios of existence of the platinum ruthenium alloy of which the distance between the carbon and catalyst metal was separated by not less than 100 nm, and the rate of degradation in Examples 3, 4, and 9. These results suggest that the carbon weight/(catalyst weight+carbon weight) is preferably no more than 24%. If the amount of carbon is increased over this value, the distance between the carbon particle in an electrode and the catalyst metal will narrow, and the number of particles which exist within a distance of 100 nm from carbon will increase. This increases the use of electron utilizing not only catalyst powder but also carbon as conduction passage. Consequently, it suggests that the corrosion of carbon increased the rate of interception of electronic conduction passage after durability test.

Figure 7:
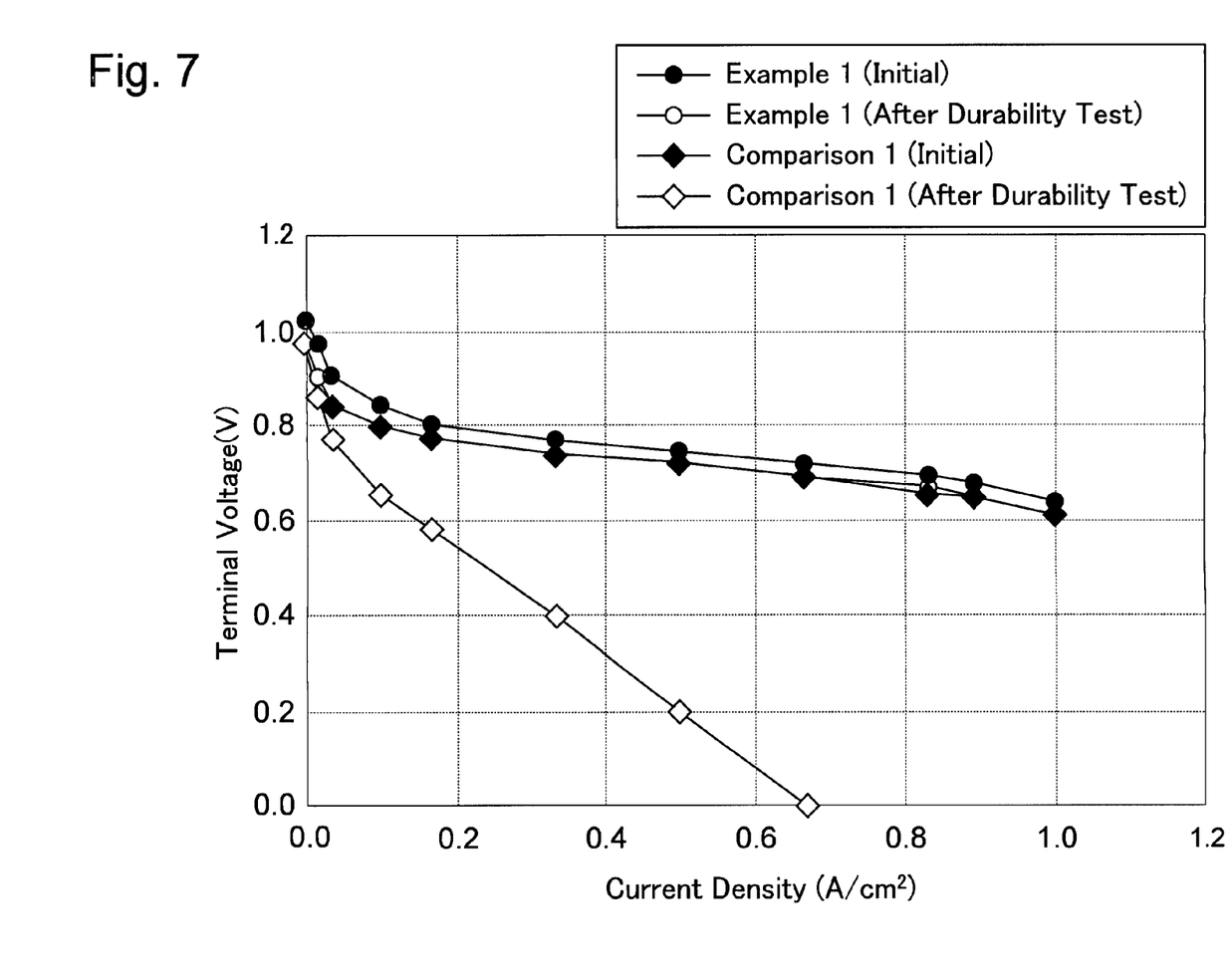
FIG. 7 shows a relation between the current density and the terminal voltage.

FIG. 7 represents a graph showing an examination of the current density when terminal voltage as shown in Table 1 was applied to the sample in Example 1 and the sample in Comparative Example 1. The humidity of fuel and the air was 70%.

TABLE 1

| | | Terminal Voltage | | |
|---|---|---|---|---|
| Current Density | Example 1 (Initial) | Example 1 (After Durability Test) | Comparison 1 (Initial) | Comparison 1 (After Durability Test) |
| 1.00 | 0.648 | 0.622 | 0.624 | |
| 0.89 | 0.684 | 0.660 | 0.658 | |
| 0.83 | 0.700 | 0.680 | 0.668 | |
| 0.67 | 0.725 | 0.700 | 0.700 | 0.007 |
| 0.50 | 0.749 | 0.726 | 0.725 | 0.200 |
| 0.33 | 0.775 | 0.743 | 0.749 | 0.400 |
| 0.17 | 0.805 | 0.778 | 0.782 | 0.586 |
| 0.10 | 0.845 | 0.803 | 0.805 | 0.658 |
| 0.03 | 0.907 | 0.842 | 0.845 | 0.776 |
| 0.02 | 0.976 | 0.903 | 0.865 | 0.865 |
| 0.00 | 1.025 | 0.98 | 0.976 | 0.976 |

Subsequently, the influence of the average particle size of catalyst powder on terminal voltage, and the relationship of the rate of dissolution between the average particle size and catalyst powder were examined. Specifically, a dissolution test of catalyst metal was conducted using the sample of Examples 10 to 17. The test method was that the capacity factor of fuel gas was increased gradually to make a pseudo fuel shortage under the power generation conditions of 0.1 A/cm$^2$ in terminal voltage and of 70% in humidity. The difference (delta $V=V_{ini}-V_{lack}$) was retained at 0.5V for one minute wherein the value was obtained by subtracting the terminal voltage ($V_{lack}$) from the initial terminal voltage ($V_{ini}$). Then only anode electrode from each of the samples were took out and decomposed by alkali solution, then quantified the amount of Pt(s) and Ru(s) by using the Inductively Coupled Plasma Atomic Emission Spectrometry (ICP) method.

Figure 8:
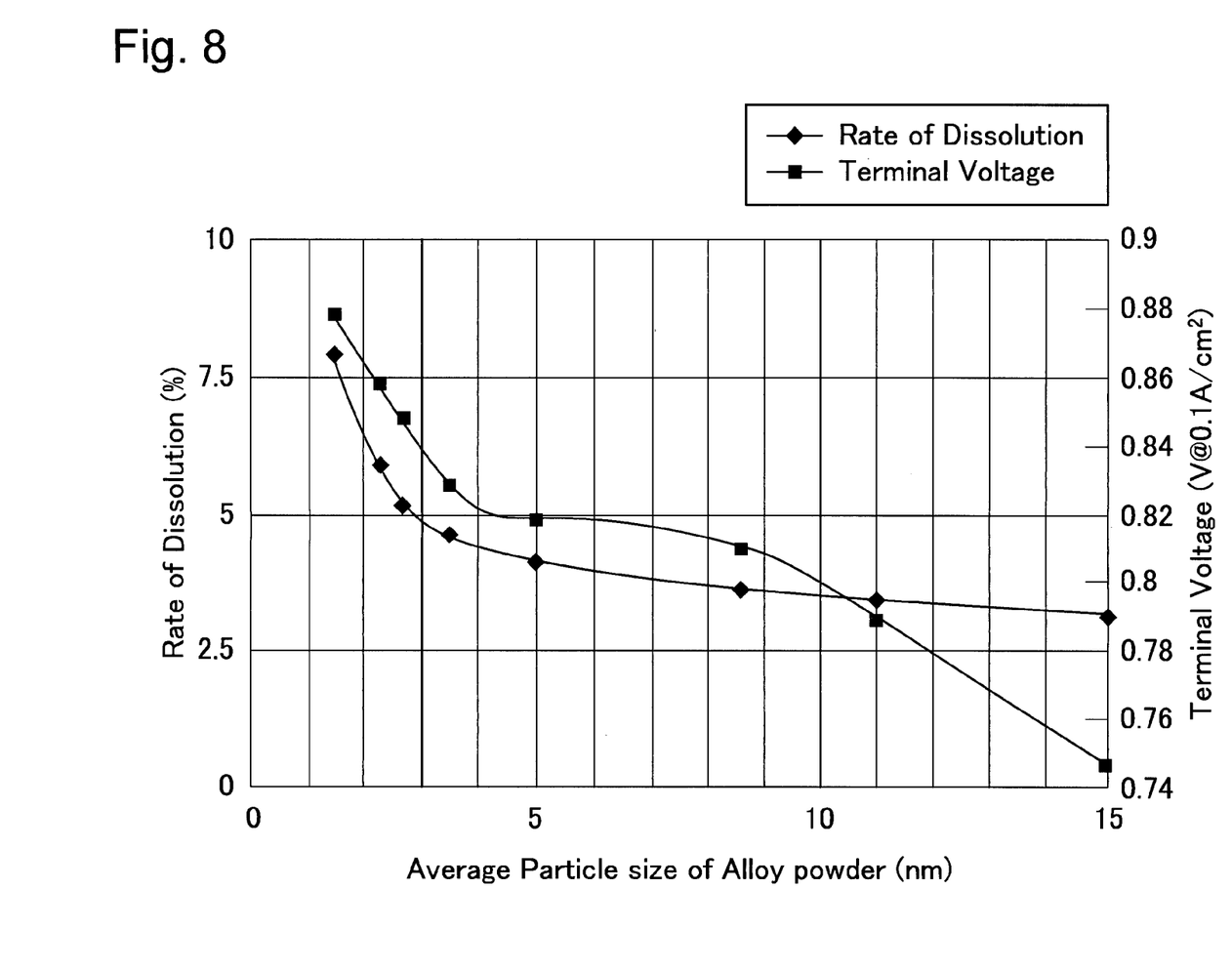
FIG. 8 shows a relation between the average particle size of powder and the terminal voltage, and a relation between the average particle size of powder and the rate of dissolution of catalyst powder.

The result is shown in FIG. 8, suggesting that as the average particle size of catalyst powder was increased, the rate of dissolution of a ruthenium ingredient (alloy ingredient) was lowered; at the same time the terminal voltage as well as catalyst activity was lowered. This shows that the average particle size of platinum alloy powder is preferably set to a range from 3 to 10 nm.

What is claimed is:

1. A solid polymer electrolyte fuel cell which varies an output according to a demand load, comprising:
    a plurality of electrode structures comprising an anode and a cathode, each having a diffusion layer and a catalyst layer, and polymer electrolyte membrane held between the anode and the cathode; and
    a plurality of separators for holding the respective electrode structures, comprising a fuel gas passage for supplying and discharging fuel gas containing hydrogen on a surface opposing the anode; and
    an oxidant gas passage for supplying and discharging oxidant gas on a surface opposing the cathode, the electrode structures and the separators being stacked, wherein
    the catalyst layer of the anode comprises a mixture of an ion conductive material, a carbon, and either a platinum powder, platinum alloy powder, or both,
    all of the platinum powder, platinum alloy powder or both therein not supported on the carbon, and all of the carbon therein existing independently from the platinum powder, platinum alloy powder or both; and
    the catalyst layer of the cathode comprises a metal support mixture in which an ion conductive material used in the catalyst of the anode and an electro-conductive material which has a supported catalyst material, are mixed.

2. A solid polymer electrolyte fuel cell according to claim 1, wherein the platinum alloy powder is a platinum ruthenium alloy having an average particle size of 3 nm to 10 nm.

3. The solid polymer electrolyte fuel cell according to claim 1, wherein the specific surface area of the carbon is in a range of no less than 50 m$^2$/g and no more than 800 m$^2$/g.

4. The solid polymer electrolyte fuel cell according to claim 1, wherein no less than 40% and no more than 100% of particles of a noble metal powder exist with a distance of no less than 100 nm from the electro-conductive material.

5. The solid polymer electrolyte fuel cell according to claim 1, wherein the platinum powder, platinum alloy powder or both, not supported by the carbon, forms an electronic conduction path across a thickness of the catalyst layer of the anode.

\* \* \* \* \*